United States Patent
Chandra

(10) Patent No.: US 7,844,891 B2
(45) Date of Patent: Nov. 30, 2010

(54) METHOD AND APPARATUS FOR CREATING, CONFIGURING AND DISPLAYING A WIDGET TO DISPLAY USER-GENERATED HIGHLIGHTS

(76) Inventor: Rohit Chandra, 987 Rosa Ct., Sunnyvale, CA (US) 94086

( * ) Notice: Subject to any disclaimer, the term of this patent is extended or adjusted under 35 U.S.C. 154(b) by 747 days.

(21) Appl. No.: 11/766,792

(22) Filed: Jun. 21, 2007

(65) Prior Publication Data

US 2008/0005664 A1    Jan. 3, 2008

Related U.S. Application Data

(60) Provisional application No. 60/815,467, filed on Jun. 22, 2006.

(51) Int. Cl.
*G06F 17/00* (2006.01)

(52) U.S. Cl. .................. 715/208; 715/205; 715/206; 715/207; 715/230

(58) Field of Classification Search .............. 715/200, 715/205, 206, 207, 208, 230, 233
See application file for complete search history.

(56) References Cited

U.S. PATENT DOCUMENTS

| | | | | |
|---|---|---|---|---|
| 5,727,129 A * | 3/1998 | Barrett et al. | ............ | 706/10 |
| 5,802,299 A * | 9/1998 | Logan et al. | ............ | 709/218 |
| 5,958,008 A * | 9/1999 | Pogrebisky et al. | ....... | 709/223 |
| 5,982,370 A * | 11/1999 | Kamper | ............ | 715/760 |
| 6,199,077 B1 * | 3/2001 | Inala et al. | ............ | 715/201 |
| 6,260,192 B1 * | 7/2001 | Rosin et al. | ............ | 725/39 |
| 2001/0000537 A1 * | 4/2001 | Inala et al. | ............ | 707/500 |
| 2001/0012020 A1 * | 8/2001 | Stautner et al. | .......... | 345/721 |
| 2002/0059369 A1 * | 5/2002 | Kern et al. | ............ | 709/203 |
| 2002/0107735 A1 * | 8/2002 | Henkin et al. | ............ | 705/14 |
| 2004/0225716 A1 * | 11/2004 | Shamir et al. | ............ | 709/204 |
| 2006/0116994 A1 * | 6/2006 | Jonker et al. | ............ | 707/3 |

* cited by examiner

*Primary Examiner*—Stephen S Hong
*Assistant Examiner*—Gregory J Vaughn
(74) *Attorney, Agent, or Firm*—SNR Denton US LLP

(57) ABSTRACT

A method and system for enabling the display of portions of internet documents that have been highlighted by users of a highlighting service are disclosed. Accordingly, a highlighting service includes a web portal with a web page providing users with a snippet of code, which, when inserted into an internet document, causes the internet document to display highlights from the highlighting service. The snippet of code can be configured to query the highlighting service for highlights that were made by certain users, or, highlights made on documents from certain domains, and so forth. The code associated with the user interface object displaying the highlights can e configured to periodically query the highlighting service to retrieve up-to-date highlights, thereby dynamically changing the highlights appearing on a web page or internet document.

15 Claims, 14 Drawing Sheets

FIG. 7

Roohit.com

FILE  EDIT  VIEW  BOOKMARKS  TOOLS  HELP

HTTP://Roohit.com

Popular Recent Highlights Made By My Network Universe, Today This Week

| HOME | KEEP A HIGHLIGHTER HANDY | My HiLites | Related HiLites | Browse Hilites | Do you have a WebSite? |

My Contacts  Import Contacts  Import Bookmarks  My URLS  MY Friends

My Contacts List

| ☐ DELETE | NAME | EMAIL ADDRESS | ACTION |
|---|---|---|---|
| ☐ | John Doe | John_Doe@mail.com | Edit |

[ADD NEW]  [DELETE]

FIG. 11

MyBlog.com

FRIDAY, MAY 19, 2007

TODAYS's MARKET OVERVIEW

Stocks picked up where they left off last Friday, catching a bid on another round of M&A activity.

Per usual, the first day of the trading week was packed with more deal-making news, lending further evidence that the financial markets continue to draw strength from the liquidity factor.

The day's biggest headline involved news that a consortium led by the Royal Bank of Scotland sweetened its bid for ABN Amro (ABN 47.98 - 0.29) to $95.5 bln. That represented a 13.7% premium to the offer made by Barclays (BCS 57.98 +0.63).

BLOG ARCHIVE

▽ 2007
 ▽ MAY (1)
 ▽ APRIL (7)

WHAT OTHERS ARE SAYING:

JANE DOE'S HIGHLIGHTS:

With industry leaders like Qualcomm Inc. and Microsoft Corp. releasing their financial results later this week, many investors are bracing for disappointment.

METHOD AND APPARATUS FOR CREATING, CONFIGURING AND DISPLAYING A WIDGET TO DISPLAY USER-GENERATED HIGHLIGHTS

RELATED APPLICATIONS

The present application claims the benefit of the filing date of the U.S. Provisional Patent Application with Ser. No.: 60/815,467, filed on Jun. 22, 2006, the contents of which are incorporated herewith.

FIELD

The present invention relates generally to web-based authoring tools. More particularly, the present invention relates to methods and systems that enable the display of user-highlighted portions of internet documents.

BACKGROUND

A wealth of information is available on the Internet, and particularly that segment of the Internet referred to generally as the World Wide Web. However, despite vast improvements in search engines, finding the particular information that one is interested in can still be a challenging and time-consuming task. Perhaps even more frustrating is the lack of tools available to enable a user to retrieve previously searched for and discovered information. In the realm of search and retrieval, search engines aid in the search but leave much to be desired when it comes to information retrieval.

One common mechanism used for information retrieval is referred to generally as a bookmark. A bookmark is a mechanism or function enabling a user to save a copy of a uniform resource locator (URL). For example, if a user finds an article of interest at URL, http://www.interesting-article.com/article 12345.htm, the user can save the URL as a bookmark so that at a later time the user can simply select (e.g., with a mouse or other pointing device) the bookmark to reload the document associated with the URL. The user might choose to categorize the bookmarks. Traditionally, bookmarks have been facilitated by a web browser application and stored at the computer on which the web browser application resides. However, more recently online bookmarking services have provided users with a way to store bookmarks online, making the bookmarks accessible from any network-connected computer.

As a means of information retrieval, bookmarks have several shortcomings. One problem with bookmarks is they provide little, if any, explanation or context as to what it is about the associated document that may be significant. For instance, a bookmark simply associates a URL with a document. A user may generate a bookmark for a particular web page because of a single passage in an article, or a particular blog entry on a web page with many blog entries. When the user retrieves the web page at a later time by means of selecting the bookmark, the user may not be able to remember what it is that is significant about the web page and why he or she saved the bookmark in the beginning.

Another problem with bookmarks is that they become stale, and in some cases expire, over time. For instance, an internet document may change between the time that a user generates a bookmark, and then revisits the associated web page at a later time. In some cases, a URL may expire altogether. For example, the document associated with the URL may be removed from the server such that the URL returns an error message indicating the document no longer exists.

Another problem with bookmarks is they are a less than ideal mechanism for sharing information. For example, to share information with a bookmark facilitated by a web browser application, a user must generally email the bookmark to another user. When the recipient receives the email including the bookmark, the user must select the link—if the bookmark is implemented as a user-selectable link—in order to initiate loading of the associated document in the user's web browser application. Often the bookmark is not a user-selectable link. In this case, the user must copy-and-paste, or type, the corresponding URL of the bookmark into the address bar of the web browser application. The copy-and-paste method sometimes does not work because of special characters, such as carriage return and line feed characters, in the URL. In any case, the additional steps required to access the relevant document are often viewed as burdensome. Often it is only a subset of individuals who end up going through the process necessary to load the relevant document. When the relevant document is finally loaded into and displayed by the recipient's web browser, the recipient of the bookmark may not appreciate the relevance of the associated document.

Realizing that many email recipients will not follow embedded links, some senders have devised a strategy wherein they copy-paste the relevant portions of an internet document into the body of an email. However, this simply shifts the copy-paste workload from the recipient to the sender. Furthermore, on the receiving end, the context is lost and credibility is in doubt as to the authenticity of the pasted material with respect to the original content. Thus, improved tools for information retrieval and collaboration are needed.

SUMMARY

A method and system for enabling the display of portions of internet documents that have been highlighted by users of a highlighting service are disclosed. Accordingly, a highlighting service includes a web page providing users with a mechanism: such as a snippet of code, which, when inserted into a second internet document, causes the second internet document to display previously made highlights and/or comments. The snippet of code can be configured to query the highlighting service for highlights that were made by certain users, or, highlights made on documents from certain domains, and so forth. The code associated with the user interface object displaying the highlights can be configured to periodically query the highlighting service to retrieve up-to-date highlights, thereby dynamically changing the highlights appearing on a web page or internet document.

Other aspects of the invention are described below in connection with the description of the figures.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 7 illustrates an example of a user interface object, referred to herein as a highlighter toolbar, which enables a user to, among other things, highlight text and objects on an internet document, according to an embodiment of the invention;

FIGS. 10 through 12 illustrate various user interface features of a highlighter web portal, according to an embodiment of the invention;

FIG. 14 illustrates an example of a web page with a user interface object referred to herein as a highlight roll, according to an embodiment of the invention.

DETAILED DESCRIPTION

Figure 1:
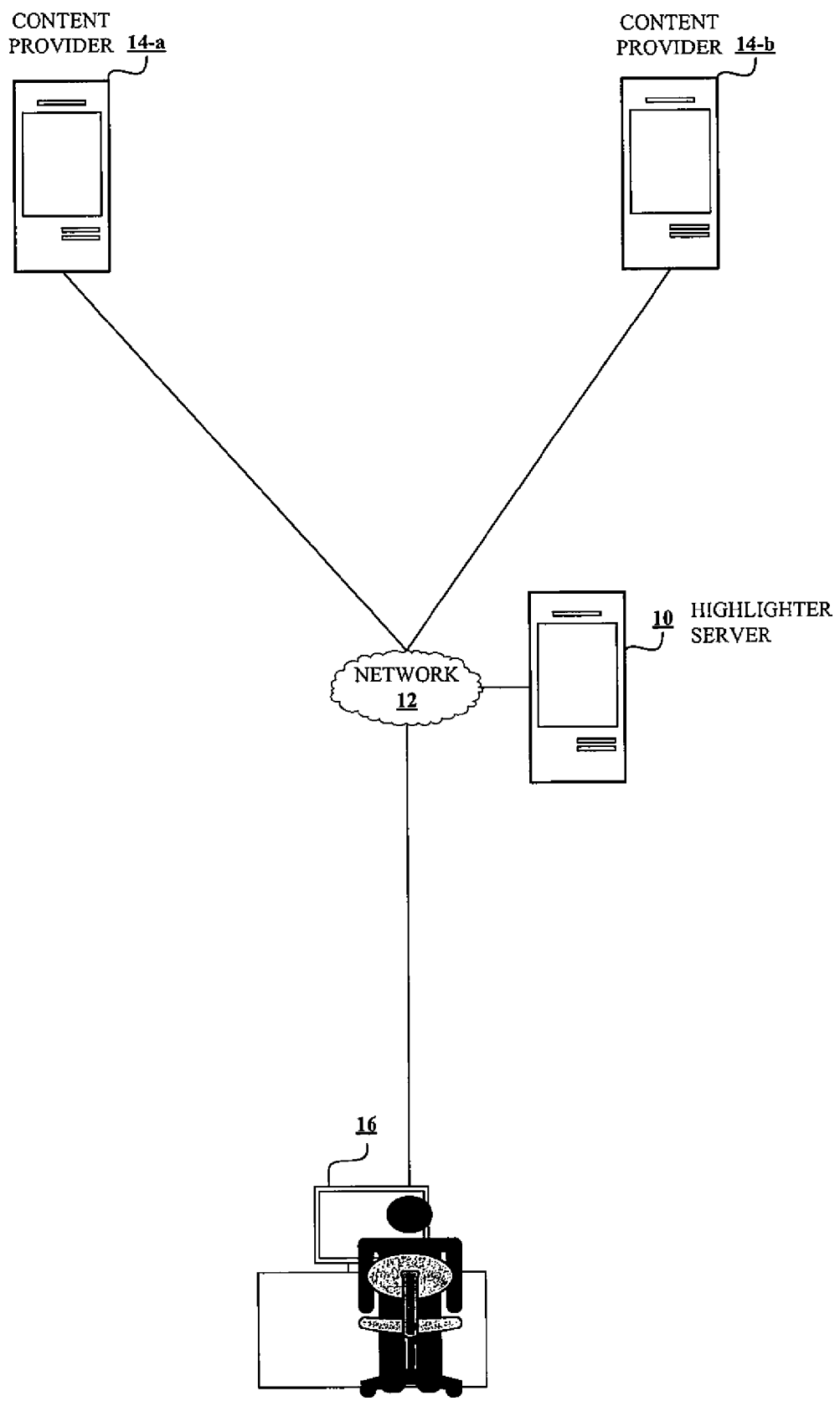
FIG. 1 illustrates an example of a computer network environment including a highlighting or highlighter server, according to an embodiment of the invention.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description. In particular, many of the various aspects and features of the invention are most easily understood by those skilled in the art when conveyed as user interface features. However, those skilled in the art will appreciate that the user interface elements illustrated and described are examples, and the invention is not to be limited by those user interface features specifically illustrated in the drawings.

Consistent with one embodiment of the invention, a highlighting service is provided by a highlighting server, which enables a user to manipulate the user interface of a web browser application executing at the user's client device to selectively highlight the text of an internet document received from a content provider's server. In so doing, any portions of text highlighted by the user are captured by the highlighter server. For example, the portion of text highlighted by the user is communicated to the highlighter server, where it is stored. Accordingly, the highlighter server enables a user to easily retrieve the highlighted text at a later time. In addition, the highlighter server enables a user to annotate and share the highlighted text, along with the internet document, with other users.

The highlighter server enables a user to selectively highlight text via a conventional web browser interface, for example, by controlling a customizable cursor with a pointing device (e.g., a mouse, trackball, joystick). The manner in which the user manipulates the user interface to selectively highlight text is similar to the way in which a user would highlight text in any number of conventional text editing applications. For example, the user may simply press and hold a button of a pointing device while manipulating a cursor with the pointing device to select a particular portion of text. However, in accordance with an embodiment of the invention and in contrast to conventional text editing applications, the highlighter server enables a user to highlight the text and graphics of internet documents served from a content provider server with the conventional controls and features of a web browsing application, without installing any special software. Moreover, any highlights made by the user are communicated in near-real-time to the highlighter server without any need for any additional user interaction. Consequently, any highlights the user makes are automatically saved at the highlighter server and can easily be viewed during a subsequent web browsing session. In an alternative embodiment of the invention, the highlights could be saved on a local device.

In addition to enabling a user to easily retrieve highlighted portions of internet documents, the highlighter server facilitates various methods of sharing highlighted portions of text with other users. For instance, in one embodiment, after a first user has made a highlight to a particular internet document, a subsequent user viewing the same document with the highlighting service invoked will optionally be able to see the first user's highlight(s). Similarly, if multiple users previously made highlights to a particular document, a subsequent user will be able to see all user's highlights. To avoid becoming overwhelmed with highlights, a user, and/or the system, can configure the settings of the highlighting service such that only highlights made by user-selected persons (including oneself), or those persons who are a member of a user-selected and/or system-selected group, are displayed. In yet another aspect, a user may generate and send an email to another user such that the email includes the highlighted portions of text and/or the entire document as highlighted.

It will be appreciated by those skilled in the art that various architectures may be used to implement a highlighting service consistent with the invention described herein. Furthermore, although many functions described herein are attributed to either a client or a server, those skilled in the art will appreciate that in alternative embodiments of the invention, a function attributed herein to a server, may in fact be implemented on, or provided by a client device. Similarly, a function described herein as being provided by a client, may be provided by a server in an alternative embodiment of the invention. Other aspects of the invention will become apparent from the descriptions of the drawings that follow.

Although the present invention is described herein primarily in the context of a highlighting service, those skilled in the art will recognize a wide variety of other applications that are consistent with the general spirit of the invention. For instance, consistent with another embodiment of the invention, a client web browser directs a request for a document (either directly, or indirectly) to a content provider hosting the document. The request may be directed to an intermediate server or intercepted by an intermediate server, which in turn, forwards the document request on to the content provider server. The content provider server sends the requested internet document to the intermediate server where it is modified in some manner "on the fly". That is, the requested internet document is modified by the intermediate server in near real time, before it is forwarded on to the requesting client web browser. Accordingly, the requesting client web browser receives a modified copy of the requested document, without making any actual modification to the document stored on the content provider server. In an alternative embodiment of the invention, the requested document is communicated from the intermediate server to the client web browser in its original unmodified form, along with a code module. At the client web browser, the code module is executed or interpreted, causing the client to modify the original document in some manner.

The modification to the document made by the intermediate server in near real time (or the client) may include overlaying an object on the document, changing a portion of the document, altering the references in a document, adding an additional element or component to the internet document, or alternatively, removing or deleting a portion or element of the originally requested document. For example, in one embodiment of the invention, a portion of the document may be highlighted. In another embodiment of the invention, an advertisement may be added or deleted from the originally requested document. In yet another embodiment of the invention, a textual portion of the document may be italicized, underlined, made bold, or have its color changed. In any case, the document is being modified by the intermediate server.

System Architecture

FIG. 1 illustrates an example of a computer network environment including a highlighter server 10, according to an embodiment of the invention. As illustrated in FIG. 1, the highlighter server 10 is communicatively coupled by means of a network 12 to several content provider servers (e.g., 14-a and 14-b). In addition, the highlighter server 10 is communicatively coupled by means of a network 12 to a user's client computer 16. It will be appreciated by those skilled in the art that the computing environment illustrated in FIG. 1 is but one example, and a wide variety of computer and network configurations might be used without departing from the spirit of the invention. For instance, the user computer, although depicted in FIG. 1 as a desktop computer, may be any of a wide variety of computing devices, including but not limited to: desktop computer, laptop computer, personal digital assistant, or mobile handset. Furthermore, although in the examples provided herein the highlighter server 10 is shown as a separate component, in one embodiment of the invention the highlighting service executing on the highlighter server 10 may reside and execute on a content provider server (e.g., 14-a, or 14-b), or a server under the control of a content provider.

In general, the user utilizes a web browser application on client computer 16 to access and display content in the form of internet documents or web pages, which are stored in whole or in part on various content providers (e.g., 14-a and 14-b). In one embodiment of the invention, a user invokes the highlighter service by prepending the address or uniform resource locator (URL) of the highlighter server 10 prior to the URL of an internet document that the user is requesting. In one embodiment of the invention, a bookmarklet, which is a button with associated code that typically resides on a web browser toolbar, automatically prepends the address of the highlighting server to the address of a document, thereby invoking the highlighting service.

Consistent with an embodiment of the invention, once a highlighter session has been invoked, a user has at his or her disposal a variety of tools for highlighting text and objects of an internet document. For instance, in one embodiment of the invention, a highlighter tool panel will appear in the web browser window and provide the user with a selection of controls enabling various features and functions of the highlighting service. In another embodiment of the invention, various controls may be provided by a highlighter toolbar. In any case, the basic function of the highlighting service is to enable a user to highlight an object (e.g., text, graphical images, etc.) of an internet document, such that the highlighted portion(s) can easily be recalled at a later time and/or shared with other users. Accordingly, as the user highlights an object, the highlighted object is communicated to the highlighter server 10 where it is stored. In one embodiment of the invention, the highlighted object (e.g., a selection of text) is stored along with any annotations or comments the user may have added, as well as a date and time indicating when the highlight was generated. The highlighted object and its associated data are stored in such a manner as to be associated with the user who generated the highlight. This allows the user to recall and view highlights from previous highlighting sessions. Furthermore, as each highlight is associated with a source (e.g., a person responsible for generating the highlight), users can configure the highlighting service to display highlights on a per user basis. That is, a user may configure the settings of the highlighting service to display only the highlights of a particular user, or group of users. For instance, as described in greater detail below, users may create and subscribe to groups. Accordingly, a user may configure the highlighting service to display highlights on a per group basis, such that only highlights from those members of a particular group are displayed. Similarly, an embodiment of the invention may enable a user to build out a social network, for example, by specifying who the user considers to be direct contacts. Accordingly, the user may configure the highlighting service to display highlights of all users within the user's social network, up to a certain degree of separation (e.g., a friend of a friend).

The highlighting service enables the user to generate highlights with conventional web browser controls. For example, in one embodiment of the invention, the user generates a highlight by simply pressing a button of a cursor control device (e.g., mouse) and dragging the cursor across an object before letting up on the button. The highlights generated by a user, according to an embodiment of the invention, are persistent over user-initiated cursor activity as well as web browsing sessions. That is, after making a highlight, each user-generated highlight remains even after the user clicks on a different portion of the internet document. Similarly, a user can navigate away from an internet document or web page on which the user has made a highlight, and the next time the user revisits the web page, the highlight will be visible so long as the user has invoked a highlighting session via the highlighting service.

In one embodiment of the invention, the highlighting service is enabled without requiring the user to download and install a client-side software application. That is, the highlighting service is enabled via the standard functions of the web browser application on the client side. For instance, in one embodiment of the invention, asynchronous JavaScript and extensible markup language (XML), referred to as Ajax, are used to provide an interactive user experience via a conventional web browser application, without the need for downloading and installing any customized software. Alternatively, the highlighting service may be enabled by a browser plug-in or browser extension. For instance, a user may download and install a software application that when executed, works in conjunction with a web browser application to enhance the functionality of the web browser application—in this case, enabling the highlighting service. In yet another embodiment, the highlighting service may be enabled by a stand alone software application. That is, the client side functionality of the highlighting service may be attributed to a daemon, or some other stand alone software application.

Figure 2:
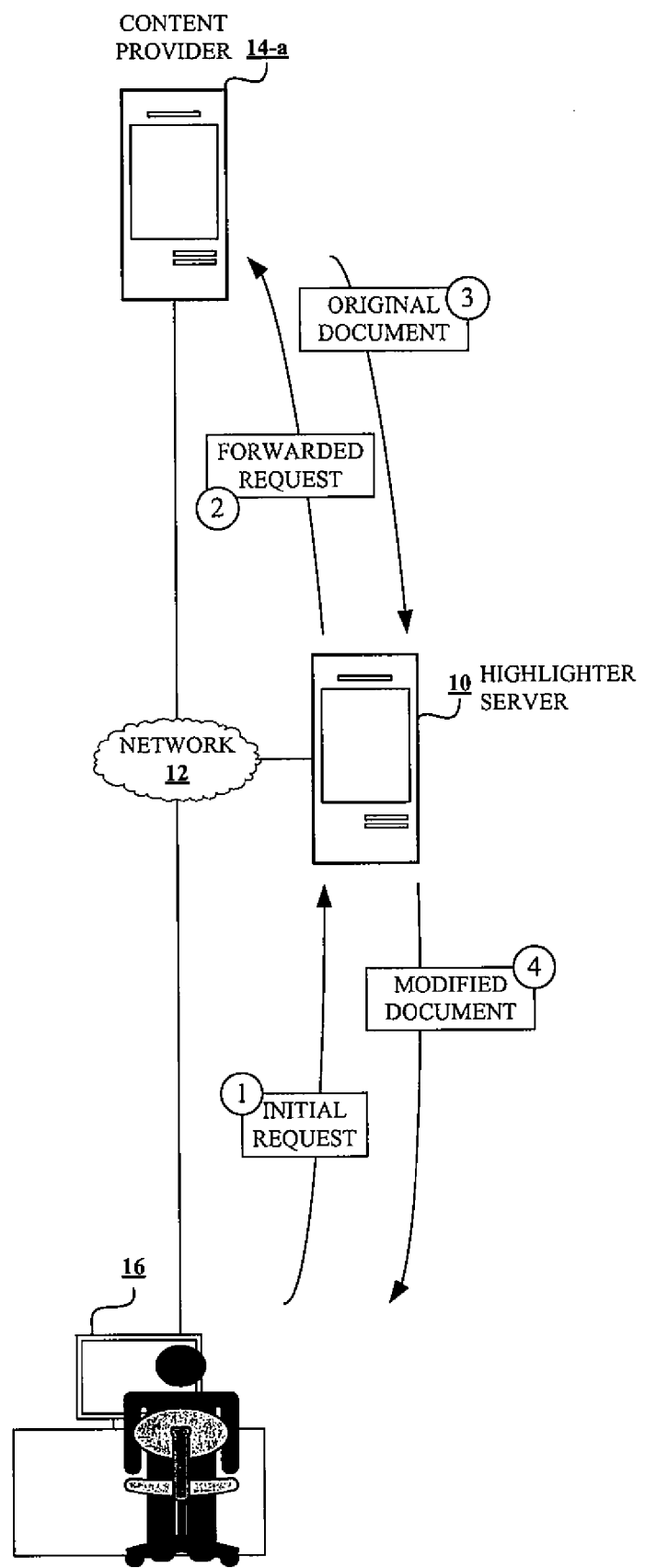
FIGS. 2 and 3 illustrate data flow diagrams showing an example of the data flow between an end-user's computing device, a highlighter server, and a content provider according to an embodiment of the invention.
Figure 3:
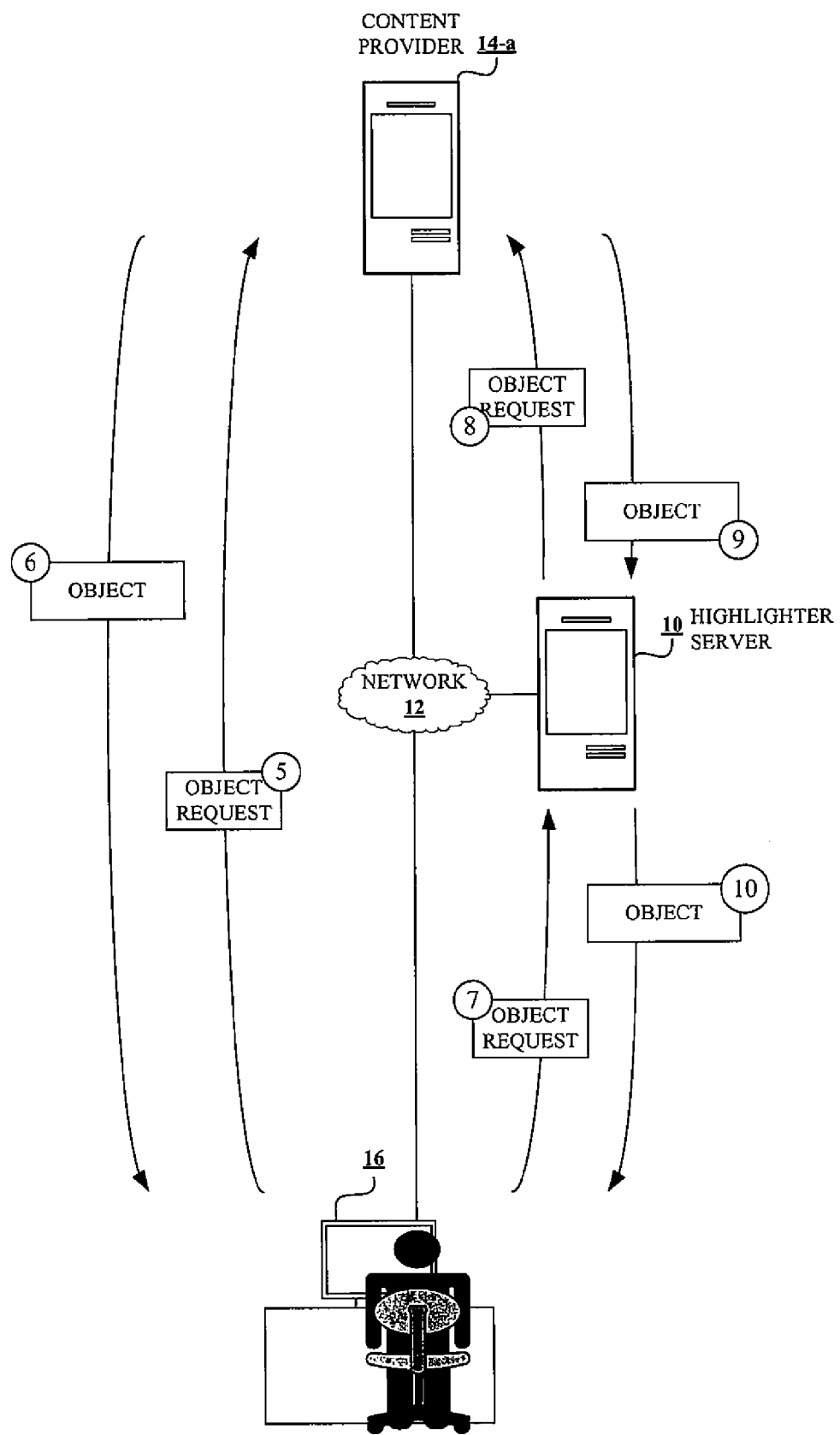

FIGS. 2 and 3 illustrate a data flow diagram showing an example of the data flow between an end-user's computing device, a highlighter server, and a content provider according to an embodiment of the invention. As illustrated in FIG. 2, a highlighting session is invoked when, at step 1, a user directs an initial request via the user's web browser application to the highlighting service hosted by the highlighter server 10. The initial request, although directed to the highlighter server 10, includes the address of a desired internet document. For instance, the address of the highlighter server 10 may be prepended to the beginning of the address of the requested document such that the request is sent to the highlighter server 10, but includes the address of the desired document hosted at the content provider 14-a. For instance, such a request may be of the form: "http://roohit.com/http://www.news.com/article123.htm".

Once the highlighter server 10 receives the initial request the highlighter server 10 analyzes the initial request and extracts the address of the requested document. For example, the address extraction logic 22 (shown in FIG. 4) extracts the address of the requested internet document (e.g., "www.news.com/article123.htm") from the request received by the highlighter server 10 (e.g., "http://roohit.com/http://www.news.com/article123.htm"). Accordingly, at step 2, the forwarding logic 22 (shown in FIG. 4) of the highlighter server 10 forwards the document request to the content provider that is hosting the requested document. At step 3, the content provider responds by communicating the original requested document to the highlighter server 10.

Once the highlighter server 10 receives the original document from the content provider, the highlighter server 10 analyzes the original document and modifies various object references within the original document. For instance, in one embodiment of the invention, the highlighter server 10 includes reference modification logic 24 for modifying various references by prepending the highlighter server address to the existing addresses in the reference. Consequently, when an object is requested, the web browser application will direct a request to the highlighter server 10 for those objects with modified references. Finally, at step 4, the modified document is communicated from the highlighter server 10 to the client computer 16.

As illustrated in FIG. 3, when the client computer 16 receives the modified document, it attempts to request the various objects that are referenced in the document. Accordingly, at step 5, for those objects stored directly at the content provider, the client computer 16 sends object requests to the content provider 14-a. Requests sent directly to the content provider 14-a are serviced by the content provider 14-a, and at step 6 one or more objects are returned to the client computer 16. For those objects which have had their reference previously modified (e.g., by prepending the address of the highlighter server), the client computer directs one or more object requests to the highlighting service (e.g., at step 7). In turn, at step 8, the highlighting server 10 communicates a request for the object to the content provider 14-a. The content provider communicates the object to the highlighting server at step 9, and finally, at step 10 the object is communicated to the client computer 16 which displays the internet document in a web browser window.

Referring again to FIG. 2, if a user requests a document that has previously been highlighted (e.g., by the requesting user, or another user), the highlighter server 10 will modify the original document by inserting the necessary object reference to ensure that the highlight(s) are displayed when the document is rendered by the user's web browser application. For instance, the reference modification logic 24 of the highlighter server 10 will modify the object reference in the original document, such that the modified object reference will cause the particular object (e.g., selection of text) to be highlighted when displayed by the web browser application. In another embodiment of the invention, a portion of executable or interpretable code sent from the highlighter server 10 to the client enables the client to query the highlighter server 10. Accordingly, the query is processed by the highlighting service, and if a particular document has been previously highlighted, the necessary data is sent to the client's web browser application to show the highlights. In one embodiment of the invention, the query indicates the URL of the currently displayed document. The highlighting service determines whether the URL is associated with any previously generated user highlights. If so, the highlighting service determines if the current user (e.g., the user viewing the document) has configured the highlight filtering mechanisms to display any of the previously generated user highlights. If the user has optionally selected to view highlights from one or more users who have previously generated a highlight on the currently displayed page, then the highlighting service will communicate the appropriate information to the client so that the highlight will be displayed.

Figure 4:
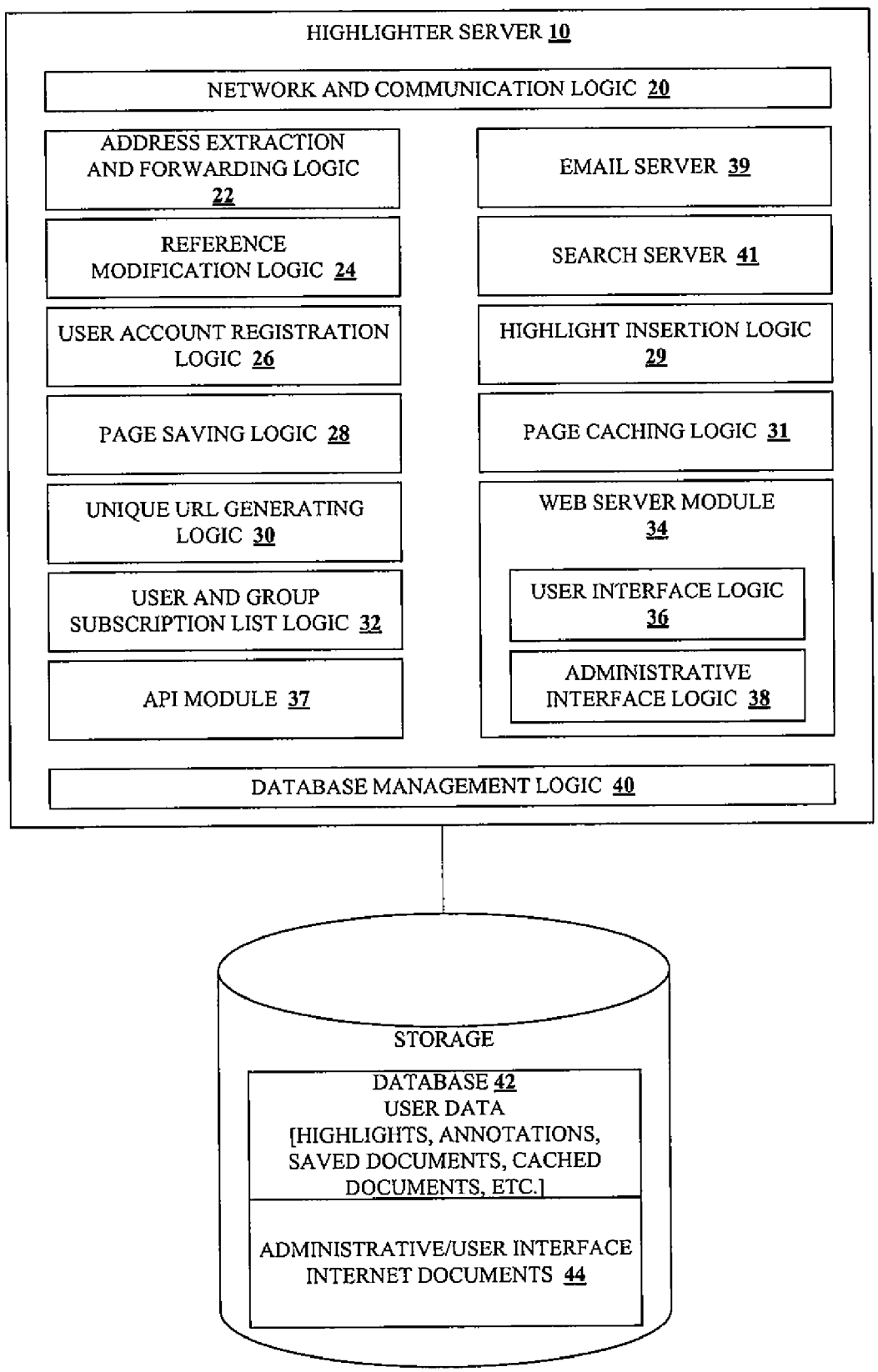
FIG. 4 illustrates a logical block diagram showing an example of the logical components of a highlighter server according to an embodiment of the invention.

FIG. 4 illustrates a logical block diagram showing an example of the logical components of a highlighter server 10 according to an embodiment of the invention. As illustrated in FIG. 4, the highlighter server 10 includes network and communications logic 20 for communicating data with various other computing devices, including client computers and content provider servers. In one embodiment of the invention, the network and communication logic 20 implements the necessary network and communication protocols, such as transfer control protocol and the internet protocol (TCP/IP) for sending and receiving data over a network, such as the public Internet. A variety of other well known communication and networking protocols may be used in accordance with an embodiment of the invention.

In one embodiment of the invention, the highlighter server 10 includes address extraction and forwarding logic 22 as well as reference modification logic 24. As described above, when the highlighter server 10 receives a request for a document hosted by another content provider, the address extraction and forwarding logic 22 extracts the document address of the requested document from the initial request received at the highlighter server 10, and then forwards the extracted document address to the proper content provider 14. Similarly, the reference modification logic 24 modifies object references in original documents received from content provider servers prior to sending the object references in the modified document to the client computer. Object references are modified, for example, to ensure that certain object requests are directed to the highlighter server, and other requests are directed directly to the content provider.

In one embodiment of the invention, the highlighter server 10 includes page caching logic 31. Accordingly, when a client requests a document hosted at a content provider, the highlighter server 10 may check its cache to determine if the highlighter server 10 has a current copy of the document stored locally. If so, the highlighter server 10 does not need to forward the request to the content provider, but instead, the highlighter server 10 can retrieve and serve the document from its cache.

In one embodiment of the invention, the highlighter server 10 includes user account registration logic 26. As described in greater detail below, in one embodiment of the invention, a user can access and use the highlighting service in one of two modes—as a registered user, or as an unregistered user. As an unregistered user, the user is not prompted to enter or provide any personal information or set-up a username and/or password. The highlighting service allows unregistered users to save and share highlights. However, if an unregistered user would like to become a registered user, the user account registration logic 26 facilitates the generation of a user account while preserving all previously generated highlights. That is, the highlight service will merge an unregistered user's data into a registered account, thereby preserving any configuration settings and highlights the user made as an unregistered user.

In one embodiment of the invention, the highlighter server 10 includes page saving logic 28 and unique URL generating logic 30. In certain situations, a user may desire to save a copy of an internet document. For instance, many internet documents—such as web pages on news sites, and blogs—are dynamic and constantly changing. Accordingly, a user may want to highlight a portion of an internet document and then save a copy of the entire page, for example, to share with another user or group of users. The page saving logic 28 enables a user to save a copy of an entire page. The unique URL generating logic 30 generates a unique URL to associate with the saved page. Therefore, to share an internet document that has been saved by the highlighting service, a user can share the unique URL generated by the unique URL generating logic 30 and associated with the saved page.

When a highlight is made on a page that tends to be dynamic (e.g., changes frequently)—for example, such as a blog site, or a news site—highlight insertion logic 29 analyzes the content of the page to determine if, and where, a previously made highlight is to be inserted. For example, as new blog entries are posted to a blog site, thereby forcing old entries to appear positioned lower on the web page, the highlight insertion logic 29 intelligently analyzes the web page to determine where to position a previously made highlight.

In one embodiment of the invention, users can display and view highlights on a per user and/or a per group basis. Accordingly, the highlighting server 10 includes user and group subscription logic 32 to manage the creation of, and subscription to, user—as well as system-defined groups. For instance, a web-based interface to the highlighting service may provide a user with an option to create a group, and invite others to join the group. Similarly, a user may search for and join previously created groups. The group subscription logic 32 facilitates and manages such tasks. Once a member has subscribed to a particular group, the member can configure the highlighting service to display highlights from all members of the group. In one embodiment, a user may subscribe to receive emails embedded with new highlights from users in a particular group. Accordingly, the user may subscribe to receive emails on a real-time basis showing all new highlights as they are made by users. Alternatively, a user may subscribe to receive a daily, weekly, or some other time period, email summary showing relevant highlights for that time period.

In one embodiment of the invention, the highlighting server 10 includes a web server module 34. The web server module 34 not only serves documents that have been forwarded from other content providers, but the web server module 20 also provides an administrative interface to administrators of the highlighter server 10, and a user interface to various features provided by the highlighter server 10. For example, in one embodiment of the invention the web server component 34, in conjunction with the administrative interface logic 38 facilitates web-based administration and configuration of the highlighter server 10. Similarly, the web server component 34, in conjunction with the user interface logic 36, facilitates web-based configuration and setup of various features of the highlighting services provided by the highlighter server 10. A storage device stores internet documents 44 associated with the user interface logic 36 and administrative interface logic 38 provided by the web server module 34.

In one embodiment of the invention, the highlighter server 10 includes database management logic 40 for managing a data repository. Accordingly, as the highlighter server 10 receives portions of text and images from internet documents as such portions are highlighted by users, the database management logic 40 stores the highlights in a database 42. Similarly, the database management logic 40 recalls the highlights from the database 42, and provides the associated data to the web server module 34 so that the document can be manipulated (either at the server or at the client) in a manner that will display highlights when the document is rendered by a client's web browser.

In one embodiment of the invention, the highlighter server 10 includes an email server 39. Accordingly, the email server 39 facilitates the generation and sending of emails by users. For example, via one or more user interface objects, a user may be prompted to enter or select an email address in order to send a copy of a currently displayed internet document—including any user-generated highlights—to another user. The email server not only facilitates the sending of the email, but also the generation of the email and the formatting of any highlighted objects. Accordingly, an email recipient will receive an email with an embedded internet document showing any user generated highlights made by the user. The recipient need not download any special software in order to view the sent internet document and associated highlights.

Another component of the highlighter server 10 is a search server 41. In one embodiment of the invention, the highlighter server 10 provides a search interface where users can search for relevant internet documents and highlights. For example, a user may perform a keyword search, where the keyword is searched for in a portion of an internet document that has been previously highlighted by a user, or within an annotation or comments section associated with a particular highlight. The search server 41 may facilitate searches by user or by group, such that a user can enter the name or email address of a particular user as a search parameter. Furthermore, a user may search for content based on tags—a user-assigned, relevant keyword or term associated with or assigned to a piece of information, like a picture, article, or video clip, thus describing the item. Other aspects of the various search features are described in greater detail in related, co-pending U.S. patent application Ser. No. 11/766,669, entitled, "Method and System for Determining the Significance and Relevance of an Internet Document, or a Portion. Thereof", filed on Jun. 21, 2007, which is hereby incorporated herein by reference.

One embodiment of the highlighter server 10 includes an application programming interface (API) module 37. In various configurations of the highlighting server, the API module provides a common interface for communicating messages with third-party add-ons, as well as software agents. For example, in one embodiment of the invention, a third-party search engine may communicate API messages to the highlighter server, requesting information about various documents. Accordingly, the search engine may utilize an API to communicate those messages with the highlighter server 10. Similarly, third-party tools and applications that utilize highlights, and the wide variety of information and data associated with highlights, may make requests of the highlighting server 10 via the API module 37.

Those skilled in the art will appreciate that various alternative components and logic may be included in a particular implementation of the highlighter server 10, without departing from the spirit of the invention.

User Registration

Figure 5:
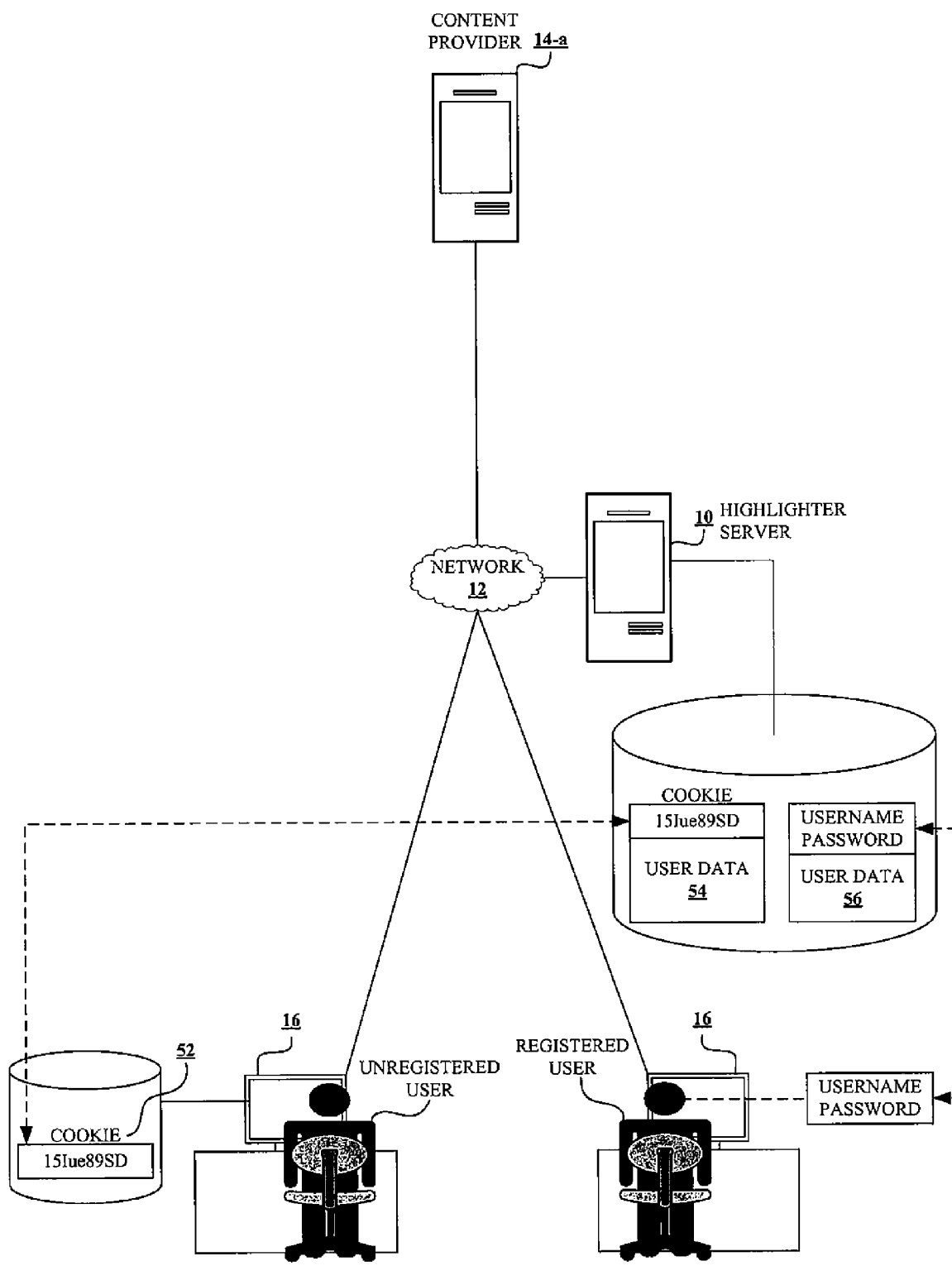
FIG. 5 illustrates an example of a registration procedure by which an unregistered user converts to a registered user, according to an embodiment of the invention.

FIG. 5 illustrates an example of a registration procedure by which an unregistered user 50 converts to a registered user 52, according to an embodiment of the invention. Advantageously, users need not download and install any customized software on a client computer in order to establish a highlighting session via the highlighter server 10. For instance, in one embodiment of the invention, asynchronous JavaScript and extensible markup language (XML), referred to as Ajax, are used to provide an interactive user experience via a conventional web browser application, without the need for downloading and permanently installing any customized software. Moreover, in one embodiment of the invention, a user need not register with the service, or establish a user account, in order to use the highlighting service. When a user has not registered with the service, a unique identifier 52 is sent from the highlighter server 10 to the client 16 executing the web browser application. The unique identifier, for example, may be an HTTP cookie that uniquely identifies the user. Accordingly, when a user selects a portion of an internet document with a highlighter cursor during a highlighting session, that portion of the document highlighted by the user is communicated to the highlighter server, associated with the unique identifier, and then stored at the highlighter server 10 (e.g., as user data 54 in FIG. 5). If, during a subsequent browsing session, a request is made for the same document, and the request includes the user's unique identifier, the highlighter server 10 will associate the highlighted portion of text with the unique identifier and manipulate the requested document to cause the highlight(s) to appear when the document is displayed in the user's web browser window. If a user decides to register with the highlighting service, the unique identifier (e.g. the HTTP cookie) is associated with a new human readable identifier, such as a user-selected username and password, and all previously generated highlights will be preserved and transferred to the user's registered account, as illustrated by user data 56 in FIG. 5

User Interface (Highlighter Panel/Toolbar/Collaboration Panel)

Figure 6:
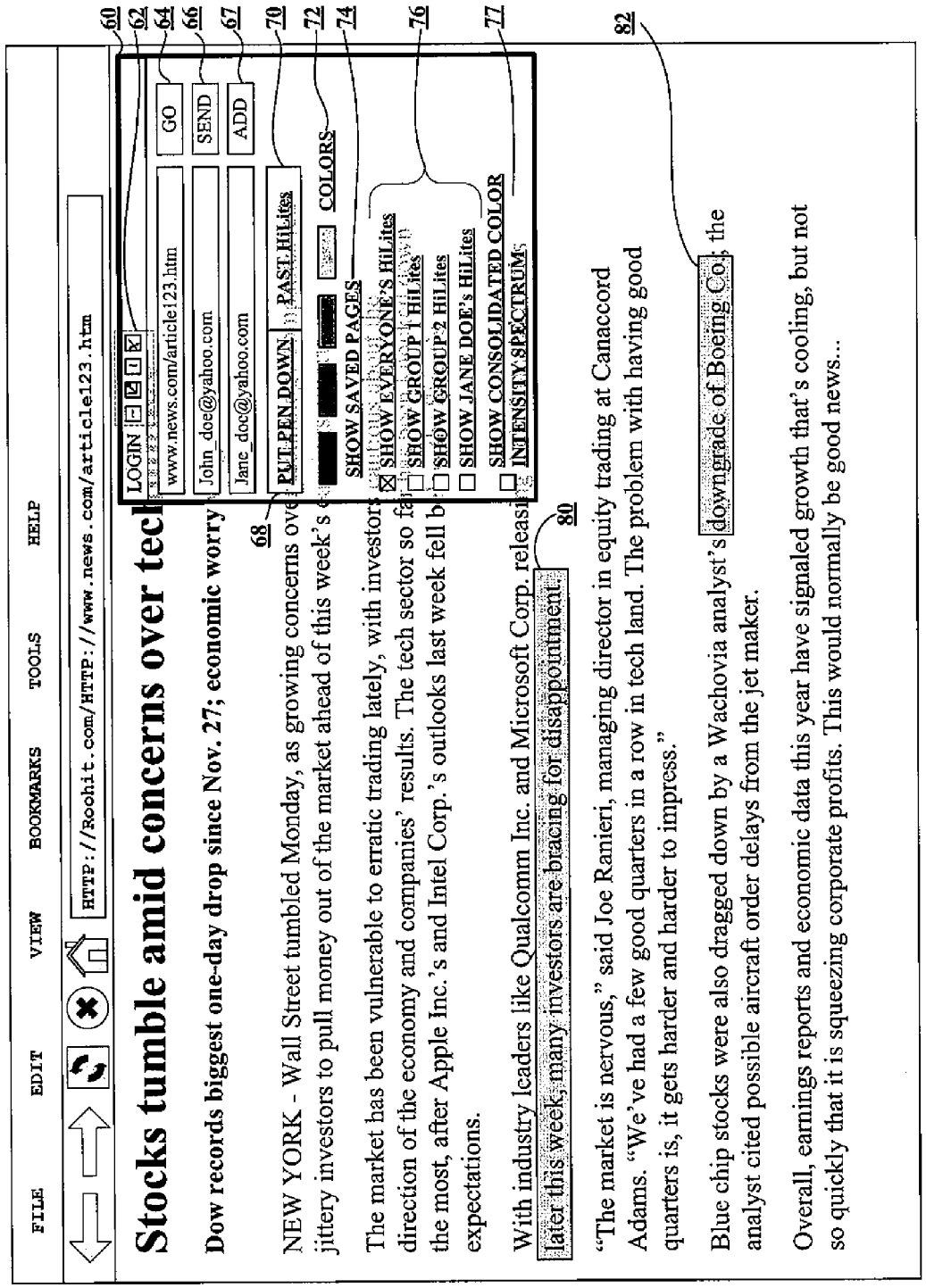
FIG. 6 illustrates an example of a user interface object, referred to herein as a highlighter panel, which enables a user to, among other things, highlight text and objects on an internet document, according to an embodiment of the invention.

FIG. 6 illustrates an example of a user interface object, referred to herein as a highlighter tool panel 60, which enables a user to, among other things, highlight text and objects on an internet document, according to an embodiment of the invention. According to one embodiment of the invention, the highlighter tool panel 60 appears as a separate window within the browser display window, and may have a variety of display modes. For instance, as illustrated in FIG. 6, the highlighter tool panel 60 is in maximized display mode and all controls are visible. In addition to a maximized mode, the highlighter tool panel 60 may also have a minimized mode. In the minimized mode, a subset of the controls may be accessible. As with conventional graphical user interface windows, a set of buttons 62 at the top of the window provide a mechanism for switching between maximized and minimized modes, and closing the tool panel window. In one embodiment of the invention, the highlighter panel may even have an invisible mode.

In one embodiment of the invention, the tool panel 60 includes an address bar 64 which provides a separate mechanism for navigating the World Wide Web and displaying internet documents hosted by different content providers. For instance, by typing an address in the text entry box of the address bar 64 displayed in the highlighter tool panel 60 and selecting the "GO" button, a user can download and display an internet document associated with the address entered. Note that the address entered in the text entry box need not include a reference to the highlighting service. The entered address will automatically be manipulated to invoke the highlighting service. If, for instance, an additional address needs to be prepended to the address entered by the user in order to invoke the highlighting service with the requested internet document, the tool panel 60 will automatically manipulate the address accordingly.

In addition to an address bar 64, in one embodiment of the invention the highlighter tool panel 60 includes an email address bar 66 where a user can enter an email address and share the currently displayed document, including any user-generated highlights in the document, with another user. For example, the email address bar 66 enables a user to enter one or more email addresses, and then select the "SEND" button to instantly send an email of the currently displayed internet document. If the currently displayed document includes user-generated highlights (e.g., highlighted text 80 and 82) those highlights will be displayed with the document in the email. Advantageously, the internet document (including any highlights) is embedded within an email such that the user need not install any special software in order to view the document and any included highlights.

In one embodiment of the invention, the highlighter toot panel 60 includes a text entry box for adding a user to a list of users whose highlights can be selectively toggled on or off. For instance, by inputting an email address (e.g., Jane_doe@yahoo.com) or username of another user in a text box, and pressing the add button 67, the user can be added to a list of users and groups 76 whose highlights can be selectively shown or hidden. Adding a user in this manner may also add the user to one or more drop down menus, selection boxes, or scroll windows (e.g., scroll window 98 in FIG. 8) used for quickly addressing emails.

A variety of other controls may be included with the highlighter tool panel 60 according to an embodiment of the invention. For example, in one embodiment of the invention, the tool panel 60 includes a button (e.g., the "PUT PEN DOWN" button 68) that toggles the cursor between a standard cursor, and a highlighter pen cursor. When the active cursor is in highlighter pen mode, for example, the highlighting tool is active. This enables a user to select text or an object using a click and drag method, by which a user simply selects an object to highlight by dragging across an object while depressing a cursor control (e.g., mouse) button. When the active cursor is not in highlighting mode, a user may select an object (e.g., a portion of text or an image) and then press a button (not shown) to generate a highlight of the selected text. In one embodiment of the invention, the tool panel 60 includes a button or link (e.g., the "PAST HiLites" button 70 in FIG. 6) that causes the web browser application to display a web page containing a list of past highlights made by the user. The list of past highlights may include a summary or excerpt from the previous highlights as well as a link to the full document from which the highlights are from. In addition, the past highlights web page may show additional information about each highlight, including but not limited to: the time and date the highlight was generated, the number of people that have viewed or selected the highlight, the address of persons with whom the user has shared the highlight, the number of other users who have highlighted the object, and/or annotations made by the user.

In one embodiment of the invention, a color palette 72 is included with the tool panel 60. By selecting a color from the color palette, the user can manipulate the color of the active highlighter cursor, and ultimately the color of any highlights the user makes. This provides each user with the ability to create customized highlight color coding schemes. Accordingly, a user may mark-up different sections of an internet document with different colors, such that each different color indicates additional information about the highlighted text. For instance, green highlighted text may support a particular proposition or indicate a positive treatment of a particular subject, while red highlighted text may indicate a negative treatment of the same subject. Those skilled in the art will appreciate the wide variety of user-customized color coding schemes that might be implemented according to an embodiment of the invention.

In one embodiment of the invention, the highlighter tool panel 60 includes a user/group filtering mechanism 74 which enables a user to select whose highlights should be displayed in a particular internet document on a per user or per group basis. For instance, referring again to FIG. 6, by selecting the "SHOW GROUP 1 HiLites" box in the tool panel 60, all highlights made by members of "GROUP 1" will be displayed to the user in the currently displayed internet document. Similarly, by selecting the "SHOW JANE DOE's HiLites" box, the user can control the display of highlights such that Jane Doe's highlights are also shown in the presently displayed document. Furthermore, in one embodiment of the invention, the filtering mechanism can be configured on a per document and/or per domain basis, such that a user can specify whose highlights the user would like to see when viewing particular documents, or documents from particular domains.

In one embodiment of the invention, the highlighter tool panel 60 includes a configuration setting that enables the user to display highlights that represent the consolidation of all user-generated highlights on a page. For example, when the check box illustrated in FIG. 6 next to the option "SHOW CONSOLIDATED COLOR INTENSITY SPECTRUM" with reference 77 is checked, the highlighting service will analyze all of the user-generated highlights associated with a particular internet document or web page. Rather than show individual highlights, the highlighting service causes portions of the interact document to be highlighted in particular colors that represent the frequency with which that portion of the document has been highlighted. For example, when the check box 77 is selected, a portion of the document that has been highlighted by many users may be shown in red. Accordingly, under this scenario, a red highlight on a particular object indicates that the particular object has been highlighted by many users. A less frequently highlighted portion of the document may be highlighted in another color. In another embodiment, the particular shade of the color may indicated the frequency with which the portion of the document has been highlighted. In one embodiment of the invention, enabling the color intensity spectrum view of highlights automatically disables the user/group view of highlights. That is, when viewing highlights in the color intensity spectrum mode, user level highlights and/or group level highlights may not be shown.

Many of the configuration settings illustrated in FIG. 6 may also be accessed and adjusted via a highlighter web portal. For example, the highlighting service provides a web-based user interface where users can set certain configuration parameters to default settings. Accordingly, when a user invokes the highlighting service without the highlighter tool panel, any configuration settings previously established via the highlighter web portal will be active by default.

Figure 7:
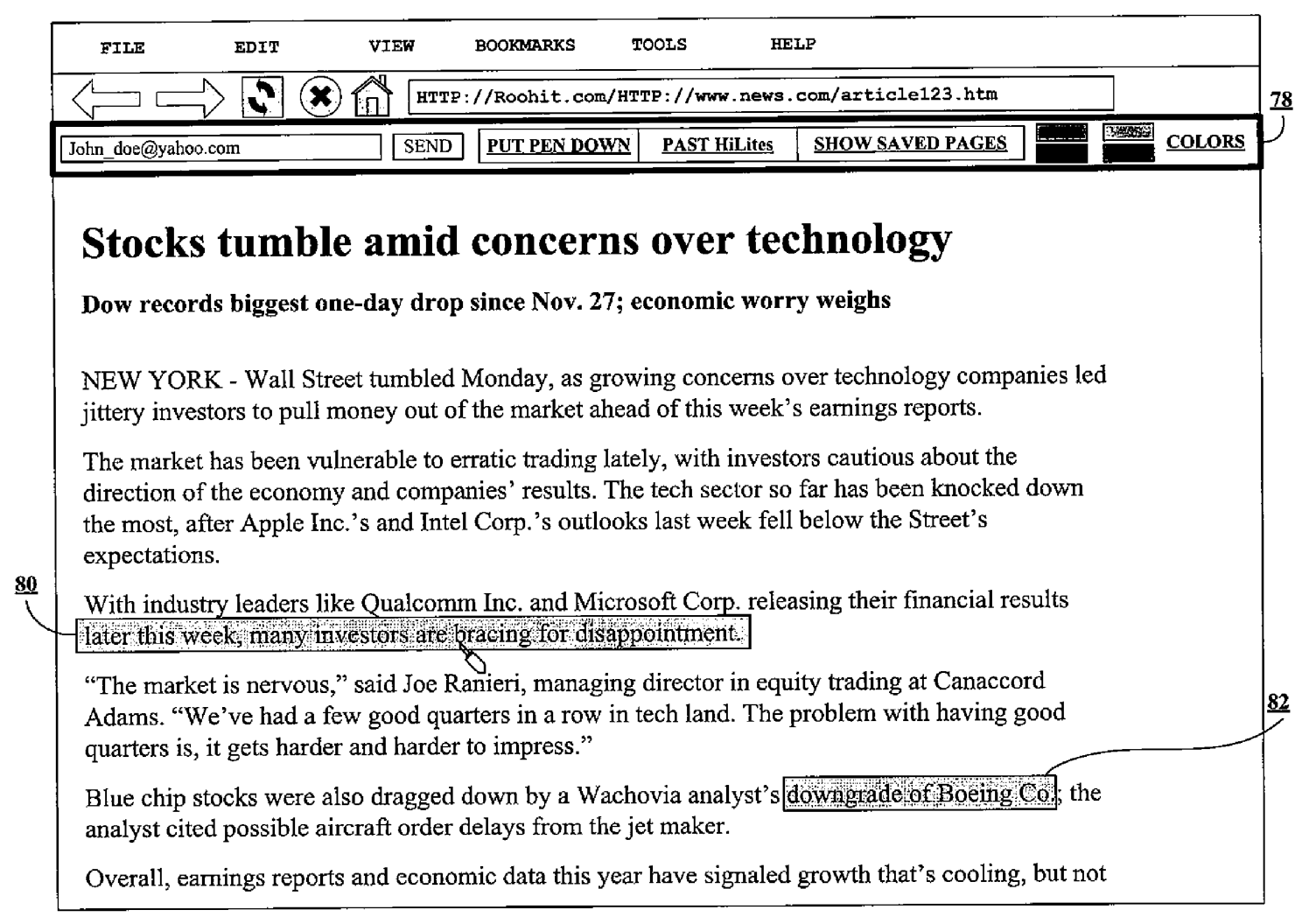

FIG. 7 illustrates an example of a user interface object, referred to herein as a highlighter toolbar 78, which enables a user to, among other things, highlight text and objects on an internet document, according to an embodiment of the invention. Similar to the highlighter tool panel 60 illustrated in FIG. 6, the highlighter toolbar 78 is a user interface object that provides a variety of controls and features associated with the highlighting service. In one embodiment of the invention, the highlighter toolbar includes the control objects described above in connection with the highlighter tool panel 60, including but not limited to: an address bar for navigating, an email address bar for sharing the currently displayed document with any user-generated highlights, a button to toggle the active highlighter cursor on and off, a button to access previously generated highlights, a button to access previously saved pages, a color palette to change the color of highlights, and a mechanism for selecting and filtering the highlights that are displayed on an internet document on a per user or per group basis. In addition, in one embodiment of the invention, the toolbar may include third-party tools. For example, the toolbar may provide one or more control objects enabling the user to quickly and easily gain access to a third-party tool, service, or application.

Figure 8:
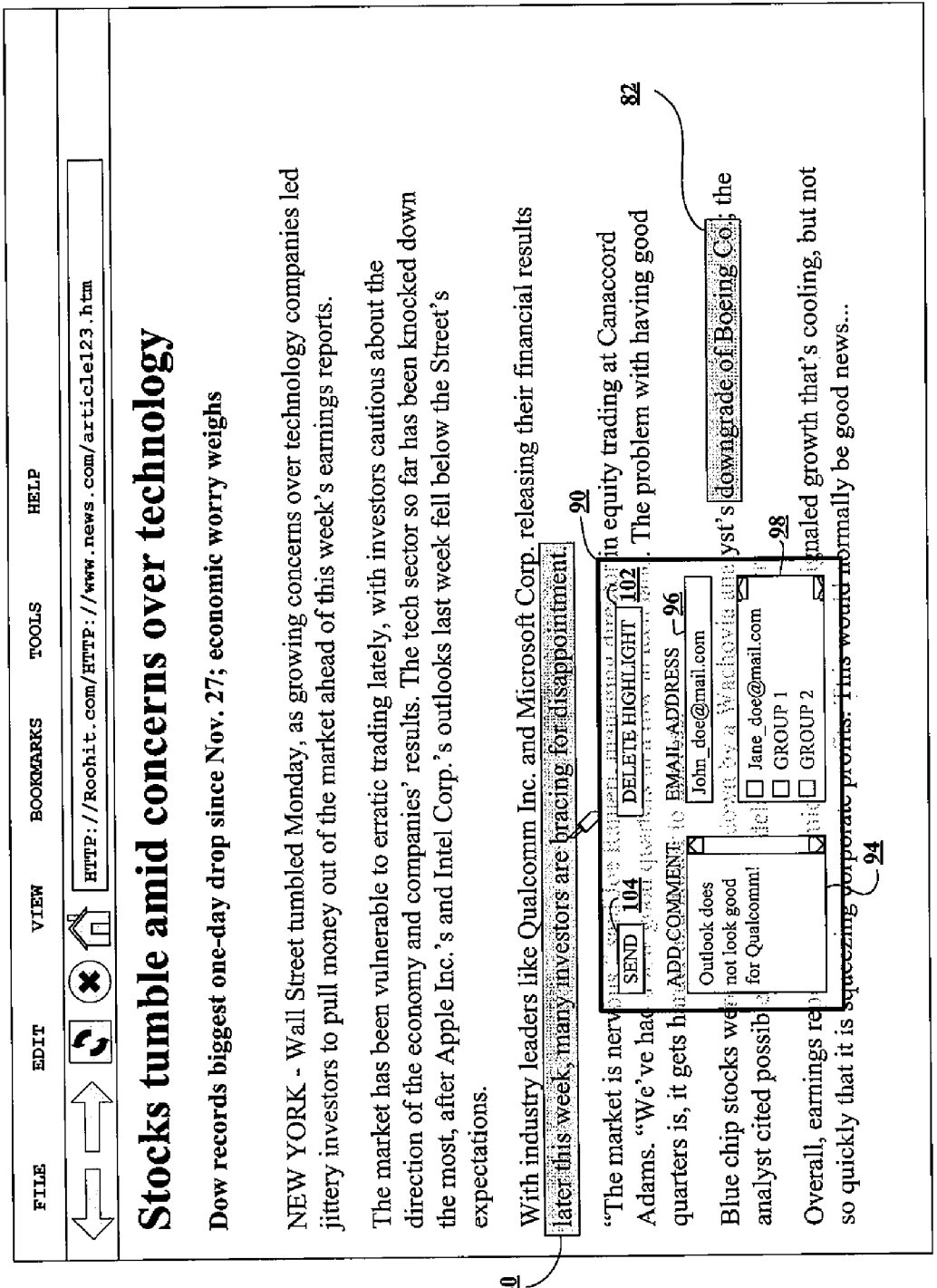
FIG. 8 illustrates an example of a user interface object, referred to herein as a collaboration panel, which enables a user to share an internet document containing user-generated highlights with another user, according to an embodiment of the invention.

FIG. 8 illustrates an example of a user interface object, referred to herein as a collaboration panel 90, which enables a user to share an internet document containing user-generated highlights with another user, according to an embodiment of the invention. As illustrated in FIG. 8, in one embodiment of the invention the collaboration panel 90 is a mouseover window or box that appears when a user moves the highlighter cursor 92 over a particular highlight 80 in the currently displayed internet document. The collaboration panel 90 includes a text entry box 94 where a user can provide a comment about the particular highlighted object. In addition, the collaboration panel 90 includes an email address bar 96 where the user can enter one or more email addresses. Also, the collaboration panel includes a scroll window 98 with a list of other users and groups with whom the user may be associated. By checking a box, or otherwise selecting another user or group, the user can quickly address an email to the user or group. After selecting and/or entering the names of those persons/groups to receive an email, the user simply selects the "SEND" button 100 to send a copy of the currently displayed internet document, including any highlighted objects (e.g., highlights 80 and 82), embedded within an email. In one embodiment of the invention, the email server 39 of the highlighter server 10 will generate and send the email to the selected recipients. Accordingly, the recipient of such an email will be able to view the entire internet document including any highlights without downloading any additional software and/or requesting any additional internet documents. In an alternative embodiment of the invention, a link to a highlighted document may be provided in the email.

In one embodiment of the invention, the collaboration panel also provides a view of any comments that a user may have entered about a particular highlight. For instance, if a user sends a comment to another user, the other user may view the comment by simply putting the highlighter cursor over the highlight. If more than one comment is associated with a particular highlight, the comments will be displayed in order such that a user can follow along with a virtual conversation based on an exchange of comments. Just as a user may filter the highlights that are displayed, in one embodiment of the invention, comments may optionally be filtered so that a user only sees comments from particular users, or groups, of interest.

Figure 9:
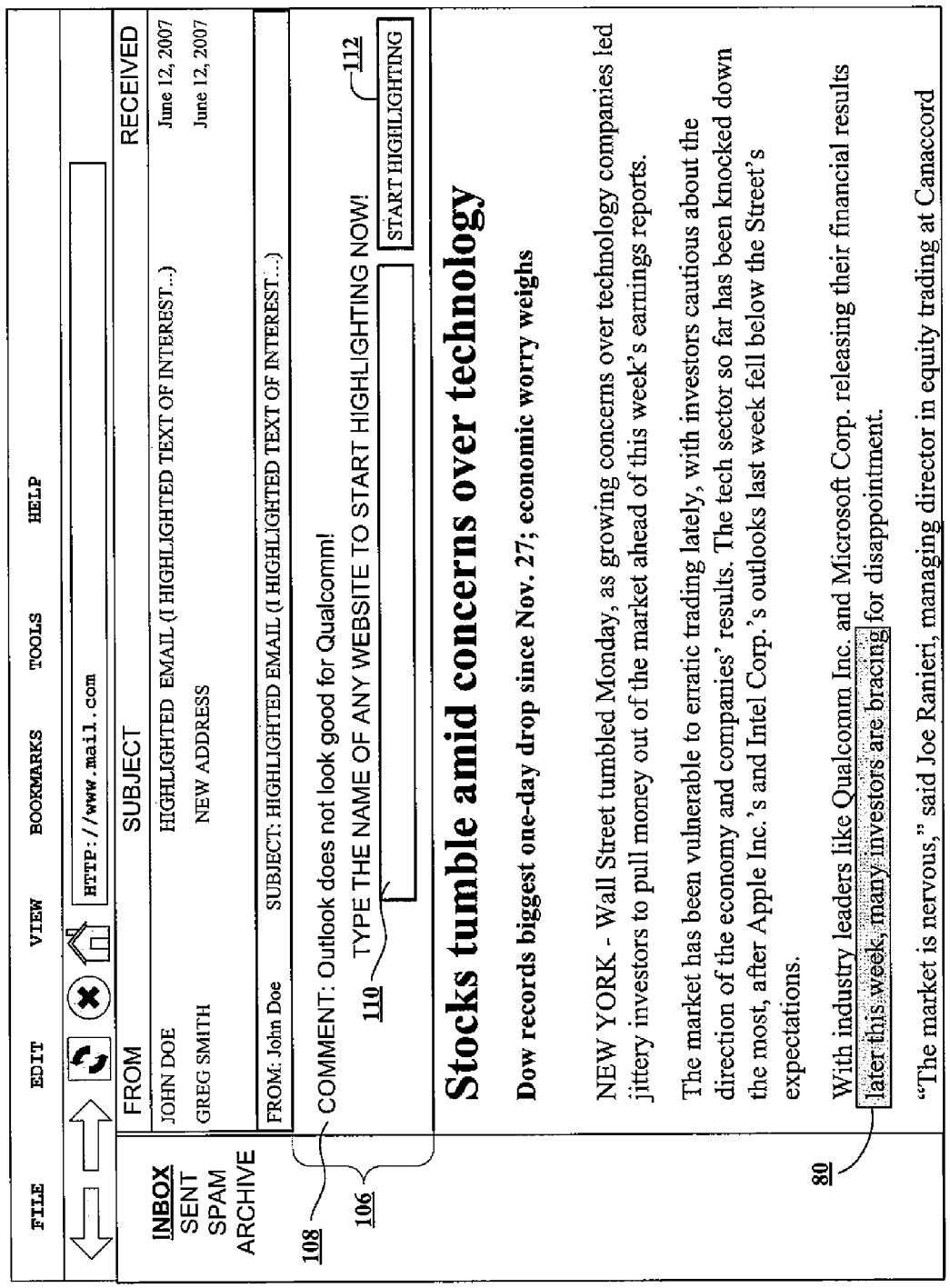
FIG. 9 illustrates an example of an email with user-generated highlights, according to an embodiment of the invention.

FIG. 9 illustrates an example of an email with user-generated highlights, according to an embodiment of the invention. As illustrated in FIG. 9, an email generated and sent via the collaboration panel includes a header portion 106 where the comment 108 that was entered in the text box 94 of the collaboration panel 90 is displayed. This provides the recipient of the email with additional information and context as to what is relevant about the document as a whole, and the highlight 80 in particular.

In one embodiment of the invention, the header portion 106 of the email also includes an address bar 110, where a user can enter the address or URL of a web site or document, and begin a highlighting session. For instance, by entering a URL in the address bar 110 of the email, and then pressing the "START HiLiting" button 112, a web browser window will open and the requested document will be displayed along with a highlighter tool panel 90.

Highlighter Web Portal

Figure 10:
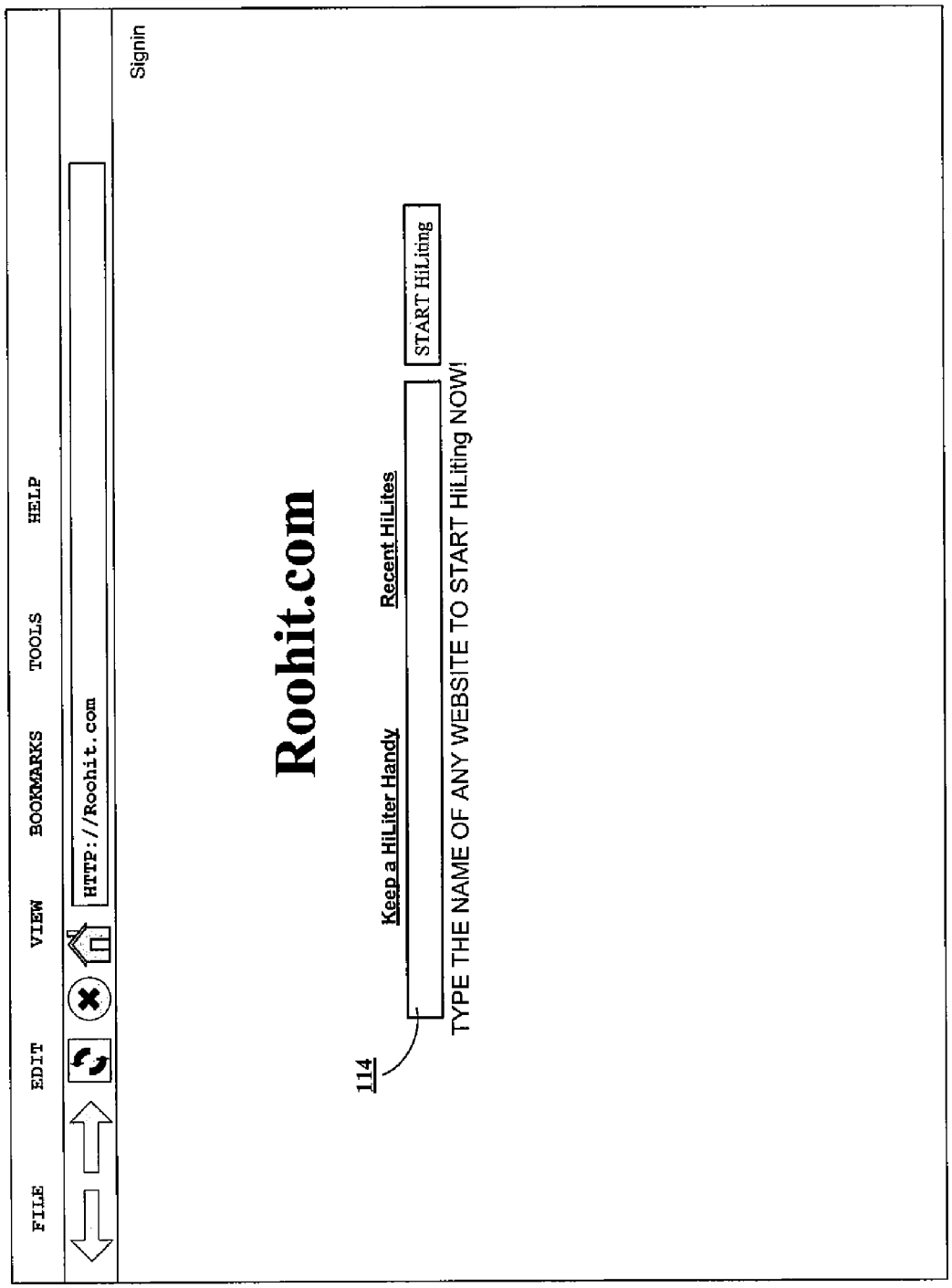

FIG. 10 illustrates a top level page (e.g. a home page) for a highlighter web portal, according to an embodiment of the invention. As illustrated in FIG. 10, in one embodiment of the invention, the home page of a highlighter web portal includes a text entry box 114 where a user can enter a URL or document address to begin a highlighting session. For example, by simply typing in the address of an internet document in the text entry box 114 and then pressing the "START HiLiting" button, a user invokes a highlighting session with the document corresponding with the address entered.

FIG. 11 illustrates a contact management page of a highlighter service, according to an embodiment of the invention. As illustrated in FIG. 11, in one embodiment of the invention, the highlighting service includes a contacts list where a user can enter and maintain personal and/or business contact information. In one embodiment, as a user shares highlights via email, the email addresses of the recipients will automatically be saved into the user's contact list. In addition, as users are added as contacts, the email addresses of those users will automatically populate certain user interface objects, such as the scroll window 98 in FIG. 8.

In one embodiment of the invention, the contact management interface may also provide a mechanism for users to build out or define a social network. For example, a user may specify which contacts to include in his or her social network. Accordingly, several of the features described herein may be configured on the basis of one's social network. For example, a user may select to see all highlights from any member within his social network.

Figure 12:
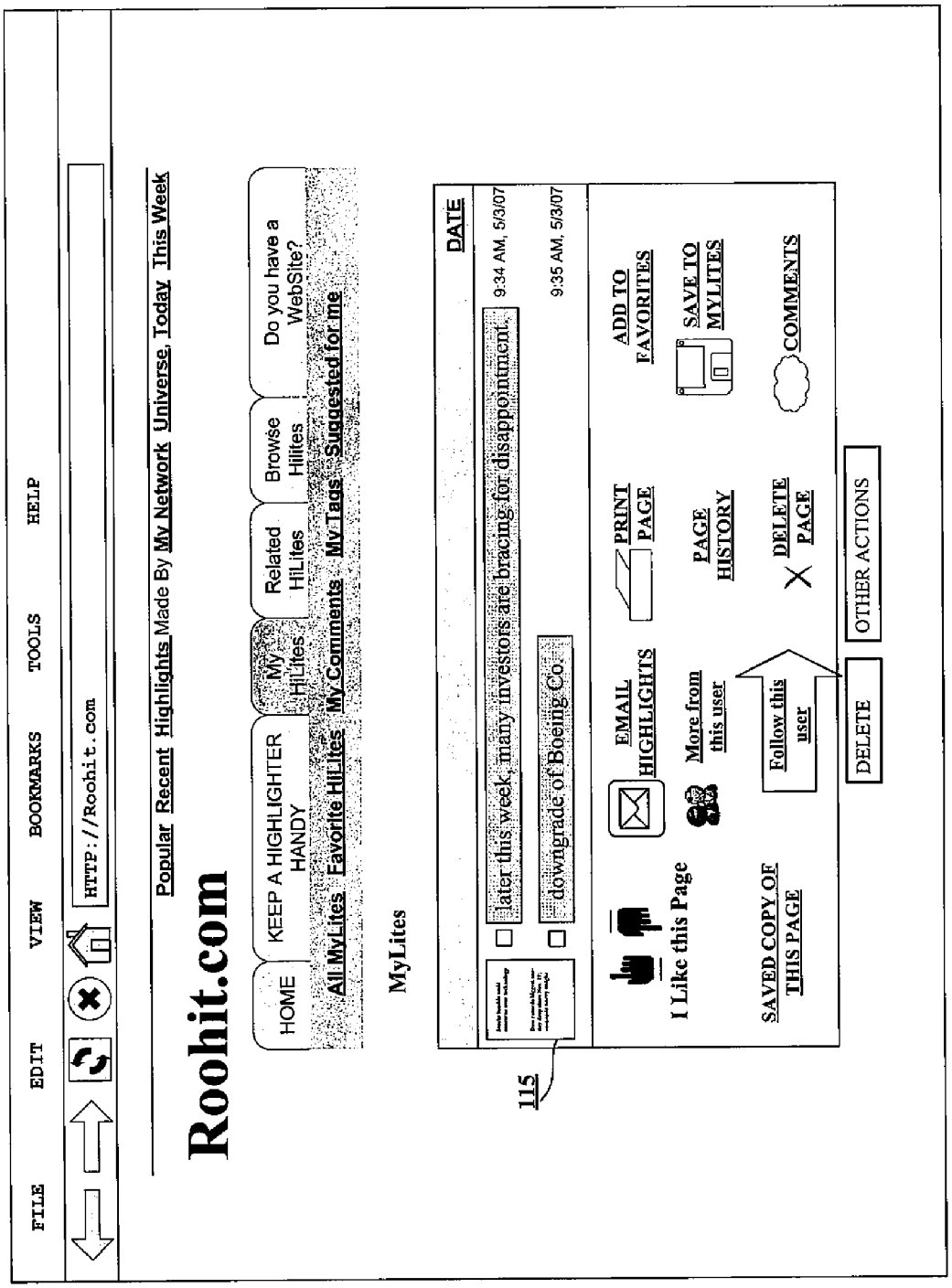

FIG. 12 illustrates a HiLites summary page, according to an embodiment of the invention. In one embodiment of the invention, a highlighter web portal provides the user with easy access to a list of all previously generated highlights of a particular user (including oneself). In addition to showing a thumbnail 115 of the document which the highlights are from, the list also includes a variety of icons enabling the user to take several actions in connection with a selected highlight, or a comment associated with a highlight. For instance, a user may rank or rate a highlight, a comment, and/or an internet document containing a highlight or comment. In one embodiment, a user may select a link to see more highlights or comments from a particular user. In addition, the user may select a button or link enabling the user to subscribe to a particular user's highlighting activities. Accordingly, as the particular user makes new highlights, a copy of such highlights and/or the internet document containing the highlights may be sent to the user in real-time, or on a predetermined or user-configured periodic schedule.

Figure 13:
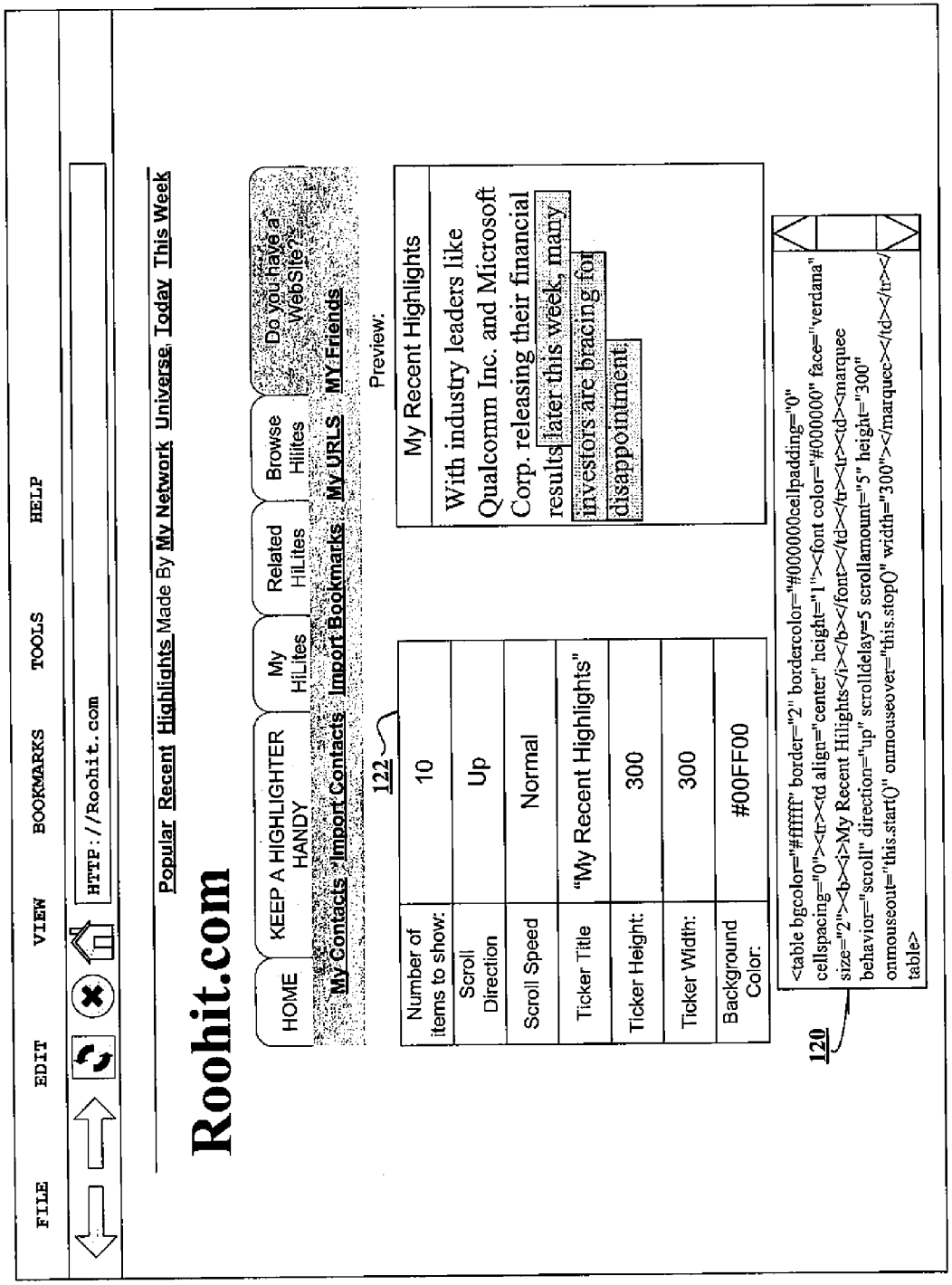
FIG. 13 illustrates an example of a web page providing a snippet of code for adding a highlighter roll to a web page, according to an embodiment of the invention.

FIG. 13 illustrates an example of a web page providing a snippet of code 120 for adding a user interface object, referred to herein as a highlighter roll, to a third-party web page, according to an embodiment of the invention. The snippet of code shown in FIG. 13 can easily be added to another web page by copying and pasting the code. The highlighter roll, once embedded in another web page, will display highlights of a particular user. The code snippet 120 is generated automatically in response to user-specified parameters 122 that are provided at one or more user interface input mechanisms (e.g., drop down lists, text entry boxes, and so on). Accordingly, the highlighter roll can be configured to show a particular number of previous highlights, scroll highlights up or down, scroll at variable speeds, and display the highlights in various user-selected formats. In one embodiment of the invention, the highlighter roll may query the highlighting service to receive a predetermined number of the most recent highlights by a user, by a group, or by everyone, or based on a particular topic, or by a grouping of particular websites or URLs. By inputting various configuration parameters, a user can display a preview of what the highlighter roll will look like when embedded in a third-party web page.

FIG. 14 illustrates an example of a web page with a user interface object referred to herein as a highlight roll 126, according to an embodiment of the invention. As described in connection with FIG. 13, the code for displaying a highlight roll 126 may be automatically generated by a highlighting service web portal, such that a blogger or another web author can easily copy and paste the code into his or her own web page, thereby adding the highlight roll 126 to his or her web page and enabling the display of user-generated highlights. As illustrated in FIG. 14, the highlight roll has a title, "JANE DOE'S HIGHLIGHTS:" as well as a text box 126 where highlights are displayed. The title is easily configurable by providing a configuration parameter as described in connection with FIG. 13. In various embodiments of the invention, multiple highlights may scroll up or down in the text box. In one embodiment of the invention, the highlights will automatically and dynamically update as a user continues to highlight new objects on new internet documents. Accordingly, a highlight roll 126 provides an excellent means of displaying a user's recent web activity, to the extent that a user's highlighting activity represents his or her web activity. A highlight roll may be particularly useful on blogging websites, but also on news websites, corporate websites, social networking websites, and others.

In one embodiment of the invention, a query is used to select the particular highlights from a highlighting service that are to be displayed in a highlight roll. Accordingly, the selection parameters for the query may be configured by a user, such that a wide variety of highlight characteristics can be used to select the particular highlights to be displayed in a highlight roll. In one embodiment of the invention, a highlight roll may be configured to display highlights from a particular user, or group of users. In another embodiment, the highlight roll may be configured to randomly query the highlighting service for user-generated highlights. In yet another embodiment, the highlight roll may be configured to query the highlighting service for highlights that were made on a particular internet document, website, or group of websites. In another embodiment of the invention, the highlight roll may be configured to query the highlighting service for highlights that contain a particular key word or words. In yet another embodiment, the highlight roll may be configured to query the highlighting service for highlights of images.

In one embodiment of the invention, a highlight roll may be used on a blog website. For example, a blogger may use a highlight roll to enhance the content on his or her blog site. Alternatively, the highlight roll may take the place of a blog altogether. For example, by displaying a highlight roll in place of a blog, a user may author blog entries by simply highlighting portions of other internet documents, and then providing comments about the highlighted portions of the document. Those skilled in the art will appreciate that a highlight roll may be used in other contexts not specifically addressed herein.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as a set of instructions stored on a computer-readable medium. The scope of the invention is defined by the claims and their equivalents.

What is claimed is:

1. A computer-implemented method, comprising:

generating, at a server and automatically in response to user-specified parameters provided via one or more user interface input mechanisms, a code snippet for a user interface object to be embedded in a first web page, the code snippet configured to query a highlighting service associated with the server for user-generated highlights of content from other web pages made by one or more visitors to the other web pages and to display the highlights within the user interface object;

following embedding, in response to user-specified action, of the code snippet in the first web page, the code snippet periodically querying the highlighting service for said user-generated highlights; and upon receiving the highlights of content, displaying the highlights of content in the user interface object embedded in the first web page, said displaying being in a browser of a computer system.

2. The computer-implemented method of claim 1, wherein, in addition to the user-generated highlights, the user interface object displays information associated with the user-generated highlights, a URL highlights were made on, and/or users who generated the highlights.

3. The computer-implemented method of claim 1, wherein the code snippet is configured to query the highlighting service for user- generated highlights that satisfy specific parameters, and the user interface object is configured to display user-generated highlights and/or associated objects having characteristics that satisfy the specific parameters.

4. The computer-implemented method of claim 3, wherein the specific parameters include any of the following: a parameter indicating the source of the highlight; a parameter indicating a rating associated with a highlight; a parameter indicating a popularity level of a highlight: a parameter indicating how frequently a highlight has been emailed; a parameter indicating a domain from which a document including the highlight is from; a parameter indicating who has made comments on the highlight, on the document the highlight is from, or the domain the highlight came from; and/or a parameter indicating a level of privacy associated with a highlight.

5. The computer-implemented method of claim 1, wherein the user-generated highlights as displayed by the user interface object are links, thereby enabling a user to retrieve a document associated with a highlight by selecting a particular user-generated highlight.

6. The user interface object of claim 1, wherein the user interface object displays one or more links to information associated with a user-generated highlight, a document containing a user-generated highlight, or a user who made a user-generated highlight.

7. The computer-implemented method of claim 1, wherein display characteristics of the user interface object are user-configurable from a web page.

8. The computer implemented method of claim 1, wherein the code snippet that queries the highlighting service for user-generated highlights is user-configurable from a web page.

9. The computer-implemented method of claim 8, wherein the first web page on which the user interface object is displayed is hosted on a first server different the a second server hosting the web page.

10. A computer-implemented method, comprising: presenting a first web site for configuring, through user-specified parameters, a user interface object to be displayed on a web page of a second web site, the user interface object i) having associated code that queries a highlighting service for user-generated highlights associated with web pages other than the web page for configuring and the web page of the second web site, and ii) being configured to display the user-generated highlights within the second webpage; receiving the user-specified parameters and configuring the code for the user interface object accordingly; and following embedding of the user interface object in the web page of the second web site, the code periodically querying the highlighting service for said user-generated highlights, and upon receiving the highlights. displaying the highlights in the user interface object.

11. The computer-implemented method of claim 10, wherein, in addition to being configured to display the user-generated highlights within the second web page, the user interface object is configured to display information associated with the user-generated highlights, the URL the highlights were made on, and/or the users who generated the highlights.

12. The computer-implemented method of claim 10, wherein presenting a first web site for configuring a user interface object to be displayed on a web page of a second web site includes enabling configuration of the user interface object without having to edit any code hosted at the second web site.

13. The computer-implemented method of claim 10, wherein the first web site provides a mechanism by which a user can establish search parameters for use by the code that queries the highlighting service for user-generated highlights.

14. The computer-implemented method of claim 13, wherein the search parameters include: source of a highlight, range of time during which a highlight was made, origin of document where the highlight was made, highlight containing specific keywords, privacy levels, comments sources, total number of highlights to be selected for display and/or minimum or maximum rating associated with a highlight.

15. The computer-implemented method of claim 10, wherein the first web site provides a mechanism by which a user can configure display parameters that determine the display characteristics of the user interface object, user-generated highlights and/or associated data displayed by the user interface object.

* * * * *